United States Patent [19]

Kurauchi et al.

[11] Patent Number: 4,728,543
[45] Date of Patent: Mar. 1, 1988

[54] MULTILAYER COATING HAVING A CLEAR TOP COAT FORMED ON A COLOR BASE COAT AND METHOD OF FORMING THE SAME

[75] Inventors: Takeo Kurauchi, Neyagawa; Atsushi Yamada, Nishinomiya; Jun Nozue, Hirakata, all of Japan

[73] Assignee: Nippon Paint Co., Ltd., Osaka, Japan

[21] Appl. No.: 852,481

[22] Filed: Apr. 16, 1986

Related U.S. Application Data

[63] Continuation-in-part of Ser. No. 660,813, Oct. 15, 1984, abandoned.

[30] Foreign Application Priority Data

Oct. 26, 1983 [JP] Japan ................................ 58-201224
Oct. 26, 1983 [JP] Japan ................................ 58-201225

[51] Int. Cl.$^4$ .............................................. B05D 3/02
[52] U.S. Cl. .................................. 427/407.1; 427/409; 427/419.5
[58] Field of Search .................... 427/407.1, 409, 419.5

[56] References Cited

U.S. PATENT DOCUMENTS 4,391,858  7/1983  Batzill ............................. 427/407.1
4,403,003  9/1983  Backhouse ....................... 427/407.1
4,477,536 10/1984  Wright et al. ............... 427/407.1 X Primary Examiner—Thurman K. Page
Attorney, Agent, or Firm—Millen & White

[57] ABSTRACT

A clear top coat composition comprising a film-forming acrylic polymer having a plurality of cross-linkable functional groups, a volatile organic liquid diluent capable of carring the film-forming polymer, a cross-linking agent for the film-forming polymer, and internally cross-linked polymer microgel particles stably dispersed in the mixture of the film-forming polymer, the diluent and the cross-linking agent. The composition is applied wet-on-wet a metallic color base coat having a similar composition containing the microgel particles and a metallic flake pigment, and cured simultaneously with the base coat.

11 Claims, No Drawings

MULTILAYER COATING HAVING A CLEAR TOP COAT FORMED ON A COLOR BASE COAT AND METHOD OF FORMING THE SAME

This application is a continuation-in-part of application Ser. No. 660,813 filed Oct. 15, 1984 now abandoned.

BACKGROUND OF THE INVENTION

This invention relates to multilayer coatings having a clear top coat formed on a color base coat and a method for forming such coatings on a substrate.

The exterior of automobiles, for example, is finished with a color base coat and a clear top coat formed on the color base coat for decorative and protective purposes. For higher productivity, the clear top coat is conventionally applied on the base coat wet-on-wet and cured simultaneously with the base coat. This method is highly suitable for inline coating operations in the automobile industry and gives a high grade finish in terms of appearance, weatherability, anti-solvent and chemical resistances, anti-discoloring resistances and the like.

In order to achieve excellent appearance, particularly excellent metallic glamor, it is imperative that the top coat applied on the base coat wet-on-wet does not cause intermixing of the two layers which, if occurs, greatly impairs the orientation of metallic flakes and the metallic glamor. For this reason, attempts have been made to decrease the compatibility between the base coat and the top coat by, for example, using a resin having a higher molecular weight for the base coat than for that of the top coat or by using different resins for different coats such as the combination of acrylic top coat/polyester or cellulose acetate butylate base coat. The compatibility between uncured two coats may also be decreased by modifying coating conditions thereof. This technique includes two-stage application of the base coat, prolonged rest intervals between application steps, elevation of the viscosity of the base coat relative to the top coat and the like. However, none of these known attempts is completely satisfactory. The use of high molecular weight resins requires a decrease in their contents at the time of application. When different resins are used for different coats, the adhesion between different coats will be decreased. Modification of coating conditions increases the number of steps and the time required for the overall coating operation.

One approach for improving aesthetic properties of a multicoat system is to provide a relatively thick top coat on the base coat. In a two coat system comprising a base coat containing aluminum flakes of 10 to 50 μm size, large aluminum flakes often protrude above the base coat surface. The clear top coat therefore must have a film thickness sufficient to compensate these protrusions. Thick clear top coats are effective also for improving the build up appearance of the entire finish when the base coat is pigmented with non-metallic solid color pigments. However, with conventional top coat compositions, the film thickness is limited to only 20–30 μm with a single coating operation, or 40–45 μm with two coating operations. This is because the conventional coating compositions tend to excessively run with an increase in the amount applied per unit area. Thick top coats may be provided by multiple coating operations. However, this technique is less efficient and requires an extensive modification of existing production lines.

Recently, from the viewpoint of economizing natural resources and energy and because of the requirements for pollution control, much research has been done for ways of increasing the nonvolatile contents of coating materials. High-solids coating systems are generally formulated by lowering the molecular weight of vehicle resins but this technique, when applied to two coat systems to be applied wet-on-wet, presents several serious problems such as poor metallic flake orientation, intermixing, poor gloss, excessive run and the like. Another approach would be to incorporate a non-aqueous resin dispersion into the system. However, experiments have shown that this method suffers from the above-mentioned problems.

It is therefore a principal object of the present invention to provide a multicoat system which may obviate the above-mentioned disadvantages. Other objects and advantages of this invention will become apparent as the description proceeds.

SUMMARY OF THE INVENTION

According to the invention, there is provided a method of forming a multicoat coating on a substrate. Said method comprises the sequential steps of:

(a) applying on said substrate a metallic color base coat composition comprising a first film-forming acrylic polymer having a plurality of cross-linkable functional groups, a volatile organic liquid diluent carrier for said first film-forming polymer, a cross-linking agent and a metallic flake pigment;

(b) applying wet-on-wet said base coat a clear top coat composition comprising a second film-forming acrylic polymer having a plurality of cross-linkable functional groups, a volatile organic liquid diluent carrier for said second film-forming polymer and a cross-linking agent; and (c) curing both coats simultaneously, wherein said metallic base coat composition and said clear top coat composition each contains internally cross-linked polymer microgel particles having a particle size from 0.01 to 10 μm, in an amount from 0.5 to 20% by weight based on the combined weight of said film-forming polymer, said cross-linking agent and said microgel particles, wherein said microgel particles are insoluble in the mixture of said film-forming polymer, said diluent and said cross-linking agent but stably dispersible in said mixture, wherein said second film-forming polymer has a molecular weight and composition, which is different from those of said first film-forming polymer.

According to the present invention the above-mentioned disadvantages can be overcome. Thus, in accordance with this invention, microgel particles of an internally cross-linked polymer incorporated to the clear top coat formulation and also to the color base coat formulation enable the top coat to be applied wet-on-wet in a single coating operation in a greater film thickness than is possible without microgel particles. This is because microgel particles give to the coating system a high structural viscosity having a yield point. Thus the system containing the microgel particles exhibits a very high apparent viscosity in a stationary state but may be freely atomized when a shear force above the yield point is applied thereto. For this reason, migration of metal flakes in the base coat due to the convection of solvent, intermixing of two coats and run are prevented to thereby ensure an excellent finish having improved gloss and other aesthetic qualities even when the top coat is applied in a relatively large film thickness. These advantages may be retained when the composition of this invention is formulated in a high-solids system.

DETAILED DESCRIPTION OF THE INVENTION

Any known film-forming acrylic polymer having cross-linkable functional groups may be used in the color base coat and the clear top coat compositions. Of course it must have a plurality of cross-linkable functional groups such as hydroxyl and carboxyl groups, and also exhibit, when formed in a cross-linked coating film, requisite protective and decorative characteristics such as weatherability, anti-solvent and anti-chemical properties, anti-impact property and so on. Preferably they have an acid number from 0.5 to 40, more preferably from 2 to 30, and a hydroxyl number from 20 to 200, more preferably from 40 to 150. If these values are too low, the density of cross-links is too low to give high strength and anti-solvent properties to the coating film. Conversely, if these values are excessive, the water-resistance of the resulting film decreases and blisters may be formed upon repeated wetting.

Acrylic polymers which may be used in the color base coat and the clear top coat compositions may be prepared by copolymerizing a mixture of an alkyl acrylate or methacrylate and a comonomer having a cross-linkable functional group by a conventional method. The mixture may also contain an ethylenically unsaturated monomer other than the above monomers.

Examples of preferable alkyl (meth)acrylates include methyl (meth)acrylate, ethyl (meth)acrylate, propyl (meth) acrylate, butyl (meth)acrylate and 2-ethylhexyl (meth) acrylate.

Examples of monomers having a cross-linkable group include acrylic acid, methacrylic acid, 2-hydroxyethyl (meth) acrylate, 2-hydroxypropyl (meth)acrylate, N-butoxymethyl(meth)acrylamide, glycidyl (meth)acrylate and the like.

Examples of other monomers which may be optionally present in the monomer mixture include vinyl acetate, acrylonitrile, styrene, vinyl toluene and the like. The monomer mixture may also contain a monomer which may catalyze the reaction between the film-forming polymer and the cross-linking agent. Usually acrylic or methacrylic acid is used for this purpose. Monomers having a sulfonic acid group such as 2-sulfoethyl methacrylate and maleic acid half esters such as monobutyl maleate may also be used.

The monomer mixture may be polymerized by any known method such as solution polymerization, non-aqueous dispersion polymerization or bulk polymerization. Emulsion polymerization followed by solvent substitution may also be employed.

The film-forming polymers thus prepared may be present in the mixture of the organic liquid diluent and the cross-linking agent in the form of a solution, a stable dispersion, or both.

The acrylic polymer used in the clear top coat composition must have a molecular weight and composition different from those of the acrylic polymer used in the color base coat composition. This is necessary for preventing intermixing of the two layers when the clear coat is applied onto the color base coat wet-on-wet. Usually, the base coat polymer has a greater molecular weight than the clear top coat polymer.

These two polymers have different compositions, i.e. different monomer constitutions and/or proportions. Preferably, the monomer constitutions and/or proportions are such that the resulting two polymers have different solubility parameters in a range from 0.3 to 2.0, more preferably from 0.3 to 1.2.

Examples of cross-linking agents used for crosslinking the film-forming acrylic polymers include polyisocyanates and aminoplast resins, e.g. condensates of formaldehyde and a nitrogen compound such as urea, thiourea, melamine, benzoguanamine and the like. $C_1$-$C_4$ alkyl ethers of these condensates may also be used. A melamine-formaldehyde condensate with a substantial number of methylol groups being etherified with butanol is preferred. The proportion of the cross-linking agent may be from 5 to 50%, preferably 10 to 40% by weight of the combined solid contents of the film-forming polymer and the cross-linking agent.

The microgel particles incorporated into the coating system of this invention should be internally cross-linked so as to be insoluble but stably dispersible in the coating system and have a microscopic average size. Several method are known to produce microgel particles. One such method commonly referred to as the non-aqueous dispersion (NAD) method comprises polymerizing a mixture of ethylenically unsaturated comonomers including at least one cross-linking comonomer in an organic liquid in which the mixture is soluble but the polymer is insoluble, such as aliphatic hydrocarbons, to form a non-aqueous dispersion of a cross-linked copolymer.

Alternatively, the microgel particles may be prepared by emulsion-polymerizing a mixture of ethylenically unsaturated comonomers including at least one cross-linking comonomer in an aqueous medium by a conventional method, and then removing water from the emulsion by, for example, solvent substitution, centrifugation, filtering or drying. Any known emulsifier and/or dispersing agent may be used in the emulsion polymerization. Emulsifiers having amphoteric ionic groups are particularly preferable. When microgel particles are incorporated into a coating composition, the structural viscosity imparted by the microgels may vary with the particle size of microgels. It is for this reason that the microgels should have a particle size distribution as uniform as possible. This may be easily accomplished by the use of an emulsifier having amphoteric ionizable groups.

Such method is disclosed in U.S. Pat. No. 4,530,946 assigned to the assignee of this application, the disclosure of which is incorporated herein by reference.

Examples of ethylenically unsaturated comonomers used for the production of microgels include methyl (meth) acrylate, ethyl (meth)acrylate, n-butyl (meth)acrylate, isobutyl (meth)acrylate, 2-ethylhexyl (meth)acrylate, styrene, α-methylstyrene, vinyltoluene, t-butylstyrene, ethylene, propylene, vinyl acetate, vinyl propionate, acrylonitrile, methacrylonitrile, dimethylaminoethyl (meth) acrylate and the like. Two or more comonomers may be combined.

Cross-linking comonomers include a monomer having at least two ethylenically unsaturated bonds in the molecule and the combination of two different monomers having mutually reactive groups.

Monomers having at least two polymerization sites may typically be represented by esters of a polyhydric alcohol with an ethylenically unsaturated monocarboxylic acid, esters of an ethylenically unsaturated monoalcohol with a polycarboxylic acid and aromatic compounds having at least two vinyl substituents. Specific examples thereof include, ethylene glycol diacrylate, ethylene glycol dimethacrylate, triethylene glycol dimethacrylate, tetraethylene glycol dimethacrylate, 1,3-butylene glycol dimethacrylate, trimethylolpropane triacrylate, trimethylolpropane trimethacrylate, 1,4-butanediol diacrylate, neopentyl glycol diacrylate, 1,6-hexanediol diacrylate, pentaerythritol diacrylate, pentaerythritol triacrylate, pentaerythritol tetracrylate, pentaerythritol dimethacrylate, pentaerythritol trimethacrylate, pentaerythritol tetramethacrylate, glycerol diacrylate, glycerol allyloxy dimethacrylate, 1,1,1-tris(hydroxymethyl)ethane diacrylate, 1,1,1-tris(hydroxymethyl)ethane triacrylate, 1,1,1-tris(hydroxymethyl)ethane dimethacrylate, 1,1,1-tris(hydroxymethyl)ethane trimethacrylate, 1,1,1-tris(hydroxymethyl)propane diacrylate, 1,1,1-tris(hydroxymethyl)propane triacrylate, 1,1,1-tris(hydroxymethyl)propane dimethacrylate, 1,1,1-tris(hydroxymethyl)propane trimethacrylate, triallyl cyanurate, triallyl isocyanurate, triallyl trimellitate, diallyl phthalate, diallyl terephthalate and divinyl benzene.

Combinations of two monomers having mutually reactive groups may be used in place of, or in addition to monomers having two or more polymerization sites. For example, monomers having a glycidyl group such as glycidyl acrylate or methacrylate may be combined with carboxyl group-containing monomers such as acrylic, methacrylic or crotonic acid. Also, hydroxyl group-containing monomers such as 2-hydroxyethyl (meth)acrylate, 2-hydroxypropyl (meth) acrylate, hydroxybutyl (meth)acrylate, allyl alcohol or methallyl alcohol may be combined with isocyanato group-containing monomers such as vinyl isocyanate or isopropenyl isocyanate. Other combinations will be apparent to those skilled in the art.

Monomer mixtures forming the microgels may contain monomers having a functional group which may react with the cross-linking agent. Examples of such monomers include acrylic acid, methacrylic acid, 2-hydroxyethyl (meth)acrylate, 2-hydroxypropyl (meth)acrylate, hydroxybutyl (meth)acrylate, allyl alcohol, methallyl alcohol, acrylamide, methacrylamide and the like.

The microgel particles may be of uniform structure or multilayer structure. In the latter case, chemical or physical functions to be played by the microgels as a whole may be shared by different layers.

The microgel particles must have a colloidal size from 0.01 to 10 microns, preferably from 0.02 to 5 microns.

The proportion of the microgels in the coating composition ranges from 0.5 to 20%, preferably from 1 to 15% by weight of the combined solid contents of acrylic polymer, cross-linking agent and microgels. If the amount of microgels is too low, the composition tends to run when applied as a thick film. Conversely, excessive amounts tend to impair the flatness of the finished coat resulting in a poor finish.

The organic liquid diluent used in the coating compositions of the present invention may be any conventional solvent used in the coating industry for dissolving vehicle resins. Examples thereof include aliphatic hydrocarbons such as hexane, heptane; aromatic hydrocarbons such as toluene and xylene; various petroleum fractions having a suitable boiling point range; esters such as butyl acetate, ethylene glycol diacetate and 2-ethoxyethyl acetate; ketones such as acetone, methyl ethyl ketone and methyl isobutyl ketone; alcohols such as butanol; and mixtures of these solvents. Selection of suitable diluents must be made depending upon the particular film-forming polymer and the form of solvent-polymer mixture, i.e. whether it is solution or dispersion. When the system contains a free isocyanate, the use of solvents containing active hydrogen atoms should be avoided.

The clear coating composition of the present invention may contain, in addition to hereinbefore described ingredients, other conventional additives as required. Examples thereof include viscosity adjusting agents such as organic montmorillonite, polyamide and polyethylene wax; surface conditioners such as silicones and organic polymers; catalysts such as p-toluenesulfonic acid; UV adsorbing agents, hindered amines and hindered phenols.

The clear coating composition of the present invention may be compounded in any convenient manner. Normally a varnish is prepared first from the film-forming polymer and the diluent. Then the remaining components are incorporated into the varnish and thoroughly dispersed therein. Finally the mixture is diluted to a suitable viscosity with the diluent. When a polyisocyanate cross-linking agent is employed, it is stored in a separate container and mixed well with the other components just prior to use.

The color base coat on which the clear top coat of this invention is applied wet-on-wet may comprise (a) a film-forming polymer having a plurality of cross-linkable groups, (b) a cross-linking agent for said film-forming polymer, (c) a metallic pigment, (d) a volatile solvent, and (e) microgel particles.

The cross-linking agent, microgels and solvent as well as other auxiliary ingredients such as viscosity adjusting agents, surface conditioners, catalysts, UV absorbers and the like may be generally the same as those used in clear top coat formulations.

The color base coat, of course, must contain suitable pigments such as titanium dioxide, iron oxide pigments, chromium oxides, lead chromate, carbon black, phthalocyanine blue, phthalocyanine green, carbazole violet, anthrapyrimidine yellow, flavanthrone yellow, isoindoline yellow, indanthrone blue, quinacridone red and violet, perylene red and the like. Extender pigments such as talc and kaolin may also be incorporated. For metallic coatings, the composition additionally contains metallic flake pigments such as aluminum flakes, copper flakes and other metallic pigments. These pigments can occupy from 5 to 50% (or 5 to 30% for metallic color) by weight of the total solid contents of the composition.

Except as otherwise specified, the proportions of various components and the method for compounding them may be generally the same as those for the hereinbefore discussed clear top coat formulations.

In the coating procedure, the base coat composition is first applied on a substrate which has been previously given a primer or otherwise treated preferably to a dry film thickness of 10 to 30 $\mu$m. After setting at room temperature or an elevated temperature, the clear top coat composition is applied wet-on-wet preferably to a dry film thickness of 20 to 70 $\mu$m, followed by setting or preheating. The coats so applied are then cured simultaneously at room temperature or an elevated temperature depending upon the type of cross-linker employed. The materials from which the substrate is made is not limited to metals such as iron, aluminum, copper and alloys of these metals but also include ceramics, plastics and other materials, provided that they can withstand an elevated temperature at which the multicoat of the present invention is finally cured.

The following examples illustrate the invention. All parts and percents are on a weight basis unless otherwise specified.

EXAMPLES

Part I. Preparation of Microgel

Preparation of Emulsifier

To a two liter flask having a stirring means, a reflux condenser, temperature-control means, a nitrogen gas-introducing tube and a decanter were added 134 parts of N,N-bis(hydroxyethyl)taurine, 130 parts of neopentyl glycol, 236 parts of azelaic acid, 186 parts of phthalic anhydride, and 27 parts of xylene. The mixture was refluxed and water was removed as an azeotropic mixture with xylene. The temperature was raised to 190° C. over 2 hours and the reaction was continued with stirring until an acid number of 145 was reached.

The reaction product was cooled to 140° C. and 314 parts of CARDURA E-10(glycidyl versatate, Shell Chemical Company) was added dropwise over 30 minutes at 140° C. The reaction was continued for additional two hours with stirring. A polyester resin having an acid number of 59, a hydroxyl number of 90 and a number average molecular weight ($\overline{Mn}$) of 1054 was obtained.

Emulsion Polymerization

To a one liter flask provided with stirring means, cooling means and temperature-control means were added 282 parts of deionized water, 10 parts of the above-described emulsifier and 0.75 parts of diethanolamine at 80° C. The mixture was stirred to make a solution. To the solution were added a solution of 4.5 parts of azobiscyanovaleric acid and 4.3 parts of dimethylethanolamine in 45 parts of deionized water. Then a monomer mixture consisting of 70.7 parts of methyl methacrylate, 94.2 parts of n-butyl acrylate, 70.7 parts of styrene, 30.0 parts of 2-hydroxyethyl acrylate and 4.5 parts of ethylene glycol dimethacrylate was added dropwise over 60 minutes. After the addition of monomers, a solution of 1.5 parts of azobiscyanovaleric acid and 1.4 parts of dimethylethanolamine in 15 parts of deionized water was added. The mixture was stirred at 80° C. for 60 minutes to give a polymeric emulsion having a nonvolatile content of 45%, a pH of 7.2, a viscosity of 92 cps (25° C.) and a particle size of 0.156 microns.

This emulsion was spray dried to obtain microgel particles having a particle size of 0.8 microns.

Part II. Preparation of Film-forming Polymers

Acrylic Varnish A

To a reactor provided with a stirrer, temperature-control means and a reflux condenser were added 80 parts of xylene, 10 parts of methyl isobutyl ketone and 20 parts of a monomer mixture having the following composition:

| | |
|---|---|
| Styrene | 5.0 parts |
| Methacrylic acid | 1.8 parts |
| Methyl methacrylate | 34.4 parts |
| Ethyl acrylate | 43.6 parts |
| Isobutyl acrylate | 3.2 parts |
| 2-Hydroxyethyl acrylate | 12.0 parts |
| Azobisisobutyronitrile | 1.5 parts |

The mixture was heated to reflux with stirring and the remaining 81.5 parts of the above monomer mixture were added dropwise over 3 hours. After the addition of a solution of 0.3 parts of azobisisobutyronitrile in 10 parts of xylene for 30 minutes, the mixture was refluxed for additional two hours with stirring. An acrylic varnish having a nonvolatile content of 50%, an $\overline{Mn}$ of 18,000 and a solubility parameter of 11.09 was obtained.

Acrylic Varnish B

To a reactor as above were added 55 parts of xylene, 7 parts of methyl isobutyl ketone and 20 parts of a monomer mixture having the following composition:

| | |
|---|---|
| Styrene | 5.0 parts |
| Ethyl acrylate | 8.1 parts |
| Isobutyl methacrylate | 61.0 parts |
| 2-Ethylhexyl acrylate | 8.4 parts |
| 2-Hydroxyethyl methacrylate | 15.0 parts |
| Methacrylic acid | 2.5 parts |
| Azobisisobutyronitrile | 4.0 parts |

The mixture was heated to reflux with stirring and the remaining 84 parts of the monomer mixture were added dropwise for 2 hours. After the addition of a solution of 0.3 parts of azobisisobutyronitrile in 35 parts of xylene and 3 parts of methyl isobutyl ketone, the mixture was refluxed for additional two hours with stirring. An acrylic varnish having a nonvolatile content of 50%, an $\overline{Mn}$ of 3,500 and a solubility parameter of 10.20 was obtained.

Acrylic Varnish C

To a reactor as above were added 70 parts of xylene, 20 parts of n-butanol and 20 parts of a monomer mixture having the following composition:

| | |
|---|---|
| Methacrylic acid | 1.2 parts |
| Styrene | 26.4 parts |
| Methyl methacrylate | 26.4 parts |
| n-Butyl acrylate | 36.0 parts |
| 2-Hydroxyethyl acrylate | 10.0 parts |
| Azobisisobutyronitrile | 1.0 parts |

The mixture was heated to reflux with stirring and the remaining 81.0 parts of the monomer mixture were added dropwise for two hours. After the addition of a solution of 0.3 parts of azobisisobutyronitrile in 10 parts of xylene, the mixture was refluxed for additional two hours. An acrylic varnish having a nonvolatile content of 50%, an $\overline{Mn}$ of 8,000 and a solubility parameter of 10.26 was obtained.

Acrylic Varnish D To a reactor as above were added 57 parts of xylene, 6 parts of n-butanol and 20 parts of a monomer mixture having the following composition:

| | |
|---|---|
| Styrene | 30.0 parts |
| 2-Ethylhexyl methacrylate | 45.2 parts |
| 2-Ethylhexyl acrylate | 5.5 parts |
| 2-Hydroxyethyl methacrylate | 16.2 parts |
| Methacrylic acid | 3.1 parts |
| Azobisisobutyronitrile | 4.0 parts |

The mixture was heated to reflux with stirring and the remaining 84 parts of the monomer mixture were added dropwise over 2 hours. After the addition of a solution of 0.5 parts of azobisisobutyronitrile in 23 parts of xylene and 14 parts of n-butanol for 20 minutes, the mixture was refluxed for additional two hours with stirring. An acrylic varnish having a nonvolatile content of 50%, an $\overline{Mn}$ of 3,400 a solubility parameter of 9.71 was obtained.

Part III. Base Coat Compositions

| Acryl Silver Metallic Enamel | | |
| --- | --- | --- |
|  | A | B |
| Acrylic Varnish A | 100 parts | 100 parts |
| U-VAN 20SE-60[1] | 13 parts | 13 parts |
| ALUMIPASTE 1109 MA[2] | 13 parts | 13 parts |
| Microgel | — | 6.4 parts |

The above ingredients were weighed to a stainless steel container and thoroughly mixed by a laboratory mixer.

|  | C | D |
| --- | --- | --- |
| Acrylic Varnish B | 100 parts | 100 parts |
| U-VAN 20SE-60 | 20.8 parts | 20.8 parts |
| ALUMIPASTE 1109 MA | 13.0 parts | 13.0 parts |
| Microgel | — | 15.6 parts |

|  | E | F |
| --- | --- | --- |
| Acrylic Varnish B | 100 parts | 100 parts |
| ALUMIPASTE 1109 MA | 13 parts | 13 parts |
| Microgel | — | 12.6 parts |
| DESMODUR N-75[3] | 28.8 parts | 28.8 parts |

[1]Mitsui Toatsu Chemicals Inc., melamine resin, 60% nonvolatile content.
[2]Toyo Aluminum Co., aluminum flake pigment.
[3]Bayer AG, polyisocyanate, 75% nonvolatile content.

PART IV: TOP COAT COMPOSITIONS

|  | A | B |
| --- | --- | --- |
| Acrylic Varnish C | 100 parts | 100 parts |
| U-VAN 20SE-60 | 36 parts | 36 parts |
| MODAFLOW[4] | 0.5 parts | 0.5 parts |
| Microgel | — | 2.2 parts |

|  | C | D |
| --- | --- | --- |
| Acrylic Varnish D | 100 parts | 100 parts |
| U-VAN 20SE-60 | 27.8 parts | 27.8 parts |
| TINUBIN 328[5] | 1.0 parts | 1.0 parts |
| Microgel | — | 3.5 parts |

|  | E | F |
| --- | --- | --- |
| Acrylic Varnish D | 100 parts | 100 parts |
| DESMODUR N-75 | 16.7 parts | 16.7 parts |
| Microgel | — | 7.0 parts |

[4]Monsanto Chemical Co.
[5]Ciba-Geigy AG, UV absorbing agents.

PART V. MULTICOAT SYSTEM

EXAMPLE I

Base coat compositions A and B were each diluted with a mixture of cellosolve acetate/butyl acetate/xylene =50/30/20 (hereinafter referred to as "base coat thinner") to a Ford Cup No. 4 viscosity of 15 seconds at 20° C.

Clear top coat compositions A and B were diluted with a 1:1 mixture of xylene and SWASOL 1000 (Maruzen Oil Co., Ltd.) (hereinafter referred to as "top coat thinner") to a Ford Cup No. 4 viscosity of 25 seconds at 20° C.

For each run, two degreased tinned sheet iron specimens were used. One specimen was placed in a horizontal position and the other in a vertical position. Then the specimens were coated once with a diluted base coat composition to a dry film thickness of 15 μm and allowed to set for 3 minutes at room temperature. Then a diluted clear composition was applied once on respective specimens wet-on-wet, allowed to set for 5 minutes at room temperature and baked at 140° C. for 30 minutes. Vertical positioned specimens were provided with a top coat having a gradient dry film thickness of from 20 to 60 μm and horizontally positioned specimens were given a uniform top coat having a dry film thickness of 35 μm. The combinations of base coat and top coat were as follows:

|  | I-a | I-b | I-c | I-d |
| --- | --- | --- | --- | --- |
| Base coat | A | A | B | B |
| Top coat | A | B | B | A |

As shown in Table I and II, multicoat systems having a clear top coat containing microgel particles gave an excellent finish in terms of orientation of aluminum flakes, gloss, run and build up.

EXAMPLE II

Following the procedure of Example I, base coat compositions C, D and top coat compositions C, D were diluted and applied on separate specimens to obtain the following multicoat combinations.

|  | II-a | II-b |
| --- | --- | --- |
| Base coat | C | D |
| Top coat | C | D |

Multicoat system II-b containing microgel particles gave satisfactory results although a low molecular weight film-forming polymer was used therein.

EXAMPLE III

Base coat compositions E and F were diluted with base coat thinner to a Ford Cup No. 4 viscosity of 15 seconds at 20° C. Following the procedure of Example I, diluted top coat compositions E and F were applied on the base coat wet-on-wet and allowed to cure at room temperature for 24 hours to prepare the following multicoat combinations.

|  | III-a | III-b |
| --- | --- | --- |
| Base coat | E | F |
| Top coat | E | F |

Tables I and II below collectively show the results obtained in the above examples.

TABLE I

| Example | I-a | I-b | I-c | I-d | II-a | II-b | III-a | III-b |
| --- | --- | --- | --- | --- | --- | --- | --- | --- |
| Base Coat |  |  |  |  |  |  |  |  |
| Varnish | Acrylic A | | | | Acrylic B | | Acrylic B | |
| $\overline{Mn}$ | 18,000 | | | | 3,500 | | 3,500 | |
| SP[1] | 11.09 | | | | 10.20 | | 10.20 | |
| Cross-linker | Melamine resin | | | | Melamine resin | | Polyisocyanate | |
| % | 14 | 14 | 14 | 14 | 20 | 20 | 30 | 30 |
| Microgel % | — | — | 10 | 10 | — | 20 | — | 15 |
| Pigment | Metallic | | | | Metallic | | Metallic | |
| Top Coat |  |  |  |  |  |  |  |  |
| Varnish | Acrylic C | | | | Acrylic D | | Acrylic D | |
| $\overline{Mn}$ | 8,000 | | | | 3,400 | | 3,400 | |

TABLE I-continued

| Example | I-a | I-b | I-c | I-d | II-a | II-b | III-a | III-b |
|---|---|---|---|---|---|---|---|---|
| SP | | 10.26 | | | 9.71 | | 9.71 | |
| Cross-linker | Melamine resin | | | | Melamine resin | | Polyisocyanate | |
| % | 30 | 30 | 30 | 30 | 25 | 25 | 20 | 20 |
| Microgel % | — | 3 | 3 | — | — | 5 | — | 10 |

(1)Solubility parameter.

TABLE II

| Example | I-a | I-b | I-c | I-d | II-a | II-b | III-a | III-b |
|---|---|---|---|---|---|---|---|---|
| Evaluation | | | | | | | | |
| Al flake orientation(1) | Not good | Good | Good | Good | Very bad | Good | Very bad | Good |
| Gloss(2) | 90 | 98 | 98 | 92 | 50 | 97 | 60 | 100 |
| Sharpness, PDG(3) | 0.5 | 0.9 | 0.8 | 0.6 | 0.2 | 0.9 | 0.3 | 1.0 |
| Run, μm(4) | 27 | 50 | 50 | 22 | 22 | 48 | 23 | 50 |
| Difference in SP | | | 0.83 | | | 0.49 | | 0.49 |

(1)Visually determined.
(2)Data measured by a digital glossmeter at 60° C., Suga Shikenki K.K.
(3)Data measured by a portable visibility glossmeter sold by Nippon Shikisai Kenkyusho.
(4)Maximum film thickness (dry) at which run begins.

EXAMPLE IV

This example illustrates the effect of the polymer used in the clear top coat having a molecular weight and composition different from those of the polymer used in the base coat on the aesthetic properties of finished multicoating.

Following the procedure of Example I, base coat composition D prepared from acrylic varnish B having a molecular weight of 3,500 and a solubility parameter of 10.20 was applied on separate specimen panels.

One panel was then coated with clear top composition D prepared from acrylic varnish D having a molecular weight of 3,400 and a solubility parameter of 9.71.

As a control, the other specimen was coated with a clear coat composition having a composition corresponding to the above clear top composition D but prepared from the same acrylic varnish B as used in the above base coat composition D.

The multicoat system using different polymers in the base coat and clear top coat compositions exhibited optimal orientation of the metallic pigments, excellent sharpness and a PGD value of 0.9, whereas control system exhibited relatively irregular orientation of the metallic pigment, relatively poor sharpness and a PGD value of 0.4.

We claim:

1. In a wet-on-wet method of forming a multicoat on a substrate comprising the sequential steps of (a) applying on said substrate a metallic color base coat composition comprising a first film-forming acrylic polymer having a plurality of cross-linkable functional groups, a volatile organic liquid diluent carrier for said first film-forming polymer, a cross-linking agent and a metallic flake pigment; (b) applying wet-on-wet onto said base coat a clear top coat composition comprising a second film-forming acrylic polymer having a plurality of cross-linkable functional groups, a volatile organic liquid diluent carrier for said second film-forming polymer and a cross-linking agent; and (c) curing both coats simultaneously, the improvement wherein said metallic base coat composition and said clear top coat composition each contains internally cross-linked polymer microgel particles having a particle size from 0.01 to 10 μm, in an amount from 0.5 to 20% by weight based on the combined weight of said film-forming polymer, said cross-linking agent and said microgel particles, wherein said microgel particles are insoluble in the mixture of said film-forming polymer, said diluent and said cross-linking agent but stably disperisble in said mixture, and wherein intermixing of the two coats is prevented by employing as said second film-forming polymer an acrylic polymer which has a molecular weight and composition which is different from those of said first film-forming polymer.

2. The method according to claim 1, wherein said second film-forming polymer has a molecular weight less than that of said first film-forming polymer.

3. The method according to claim 2, wherein said second film-forming polymer has a solubility parameter, different from that of said first film-forming polymer.

4. The method according to claim 3, wherein the difference in solubility parameter between said first and second film-forming polymers ranges from 0.3 to 2.0.

5. The method according to claim 4, wherein said difference in solubility parameter ranges from 0.3 to 1.2.

6. The method according to claim 1, wherein said cross-linking agent is in aminoplast resin.

7. The method according to claim 1, wherein said cross-linking agent is a polyisocyanate.

8. The method according to claim 1, wherein said microgel particles are produced by polymerizing a mixture of ethylenically unsaturated comonomers including at least one cross-linking comonomer.

9. The method according to claim 8, wherein said microgel particles are produced by the non-aqueous dispersion method.

10. The method according to claim 8, wherein said microgel particles are produced by emulsion polymerization.

11. The method according to claim 10, wherein said emulsion polymerization is carried out in the presence of an emulsifier having an amphoionic group.

* * * * *